United States Patent [19]

Briffod

[11] 4,134,807

[45] Jan. 16, 1979

[54] PROCESS AND APPARATUS FOR ELECTRICAL MACHINING OF AN ELECTRODE WORKPIECE BY AN ELECTRODE TOOL, USING EDM AND ECM

[75] Inventor: Jean-Paul Briffod, Monnetier-Mornex, France

[73] Assignee: Ateliers des Charmilles, S.A., Geneva, Switzerland

[21] Appl. No.: 862,448

[22] Filed: Dec. 20, 1977

[30] Foreign Application Priority Data

Dec. 22, 1976 [CH] Switzerland ............... 16224/76

[51] Int. Cl.² .............. B23P 1/00; B23P 1/04; B23P 1/08; B23P 1/14
[52] U.S. Cl. .............. 204/129.1; 204/129.25; 204/129.5; 204/224 M; 204/225; 219/69 M
[58] Field of Search .......... 204/129.1, 129.25, 129.5, 204/224 M, 225; 219/69 M

[56] References Cited

U.S. PATENT DOCUMENTS

| | | | |
|---|---|---|---|
| Re. 26,970 | 10/1970 | Bentley et al. | 204/129.25 X |
| 3,403,084 | 9/1968 | Andrews | 204/129.25 |
| 3,689,387 | 9/1972 | Jumer | 204/129.35 |
| 3,773,636 | 11/1973 | Augustin | 204/225 X |
| 3,912,898 | 10/1975 | Pfau et al. | 219/69 M |
| 4,049,942 | 9/1977 | Balleys et al. | 219/69 M |

Primary Examiner—John H. Mack
Assistant Examiner—D. R. Valentine
Attorney, Agent, or Firm—Hauke and Patalidis

[57] ABSTRACT

A process and apparatus for electrically machining an electrode workpiece by means of an electrode tool, in which the electrode workpiece is first machined by EDM by way of electrical discharges occuring across a dielectric fluid. The electrode workpiece is subsequently subjected to a finishing pass in the course of which it is machined by electrochemical machining (ECM) through a conductive electrolyte replacing the dielectric fluid. The machining phase by ECM is effected by means of the same electrode tool or by means of an electrode tool of the same dimensions as is used during the machining phase with EDM. During machining by EDM, the electrode tool is orbited, or translated, in a direction perpendicular to the axis of feed of the electrode tool relative to the electrode workpiece, with an amplitude larger than the amplitude during machining by ECM.

8 Claims, 1 Drawing Figure

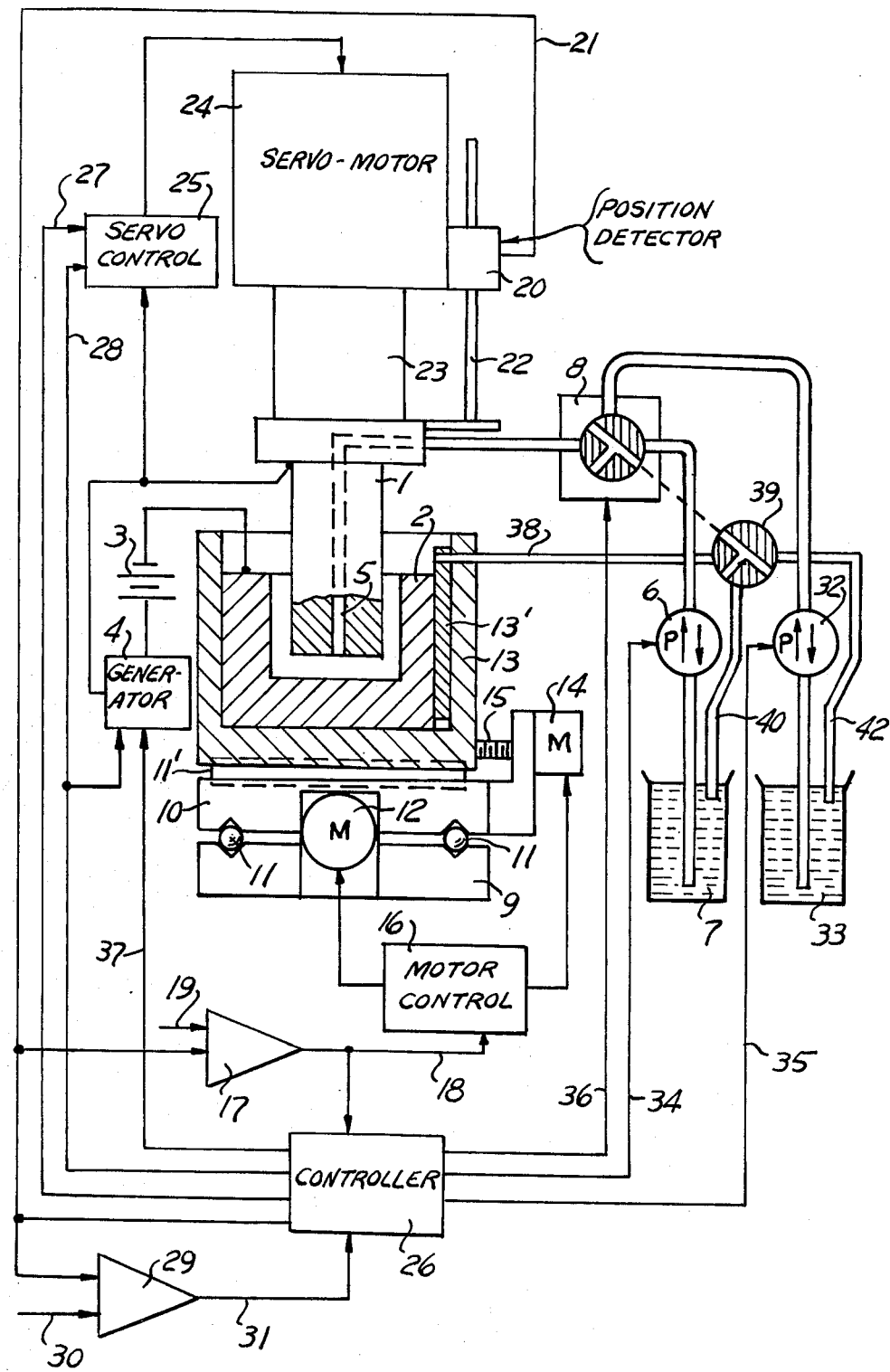

4,134,807

PROCESS AND APPARATUS FOR ELECTRICAL MACHINING OF AN ELECTRODE WORKPIECE BY AN ELECTRODE TOOL, USING EDM AND ECM

BACKGROUND OF THE PRESENT INVENTION

It is known to electrolytically polish a workpiece which has been previously machined by EDM, the electrolytical polishing being effected by means of electrode tool of the same shape as the electrode tool used in the course of the EDM machining. Such a process, which is described in U.S. Pat. No. 3,689,387 uses, for polishing the inner surface of a cavity in a workpiece, a cathode of reduced over-all dimensions relative to the electrode tool used for machining by EDM the cavity in the workpiece. The reduction in size of the cathode, relative to the electrode tool used in EDM, is necessary for obtaining a constant gap of sufficient width between the tool surface and the areas of the workpiece which are polished.

It is evident that if the areas of the workpiece which are to be polished are on the outside of the workpiece, the cathode is oversize relative to the electrode tool used during the EDM machining. In order to achieve a good quality and evenness of polishing, the distance between the cathode and the surface of the workpiece must be ten times as wide as the gap during machining of the workpiece by electrical discharges, which results in requiring a cathode of appropriate dimensions for the polishing operation. Making a second tool of a size different from that of the tool used for machining the workpiece by EDM is one of the important disadvantages of such a machining process.

The present invention has for principal object to overcome such disadvantages by permitting to use the same tool, or eventually a tool of the same dimensions, to effectuate the polishing step, insuring that an adequate and constant distance is maintained between the cathode and the workpiece.

SUMMARY

The present invention provides a new process and means for, in a first machining step, displacing the electrodes one relative to the other along a translation motion effected, at least after having fed the electrode tool into the workpiece, in a plane perpendicular to the direction of relative feed, until a predetermined amount of eccentricity of the translation motion has been achieved, and to effectuate a second machining step after having decreased at least partially the amount of eccentricity of the translation motion and retracted the electrode tool relative to the electrode workpiece of a distance substantially equal to the amount of decrease of the eccentricity.

The electrode tool used during the two machining steps is undersize such as to provide the electrode workpiece with predetermined dimensions during the first machining step by EDM, in the course of which the electrodes are relatively displaced in translation. The second machining step results in removing the rough surface finish on the machined areas of the workpiece such as to obtain, for example, while starting with a surface finish of CH-30 a final surface finish of CH-18 without requiring a change of tools. The method of the present invention therefore presents the advantage of effecting a simple and economical machining of a workpiece having a resulting surface finish of very high quality.

BRIEF DESCRIPTION OF THE DRAWING

The single FIGURE of the drawing represents, for illustrative purpose, an electrical and hydraulic schematic of a structure for practicing the process of the invention.

DETAILED DESCRIPTION OF THE PREFERRED EMBODIMENT

As illustrated in the drawing, an EDM apparatus comprises an electrode tool 1 adapted to machine an electrode workpiece 2 by means of electric pulses obtained from a DC voltage source 3 through a pulse generator 4, as is well known in the EDM art. In the course of a first machining step, a dielectric liquid is introduced in the gap between the electrode tool 1 and the workpiece 2 by means of a channelway 5 disposed in the electrode tool 1. The dielectric fluid is supplied to the channelway 5 by a pump 6 whose input is connected to a tank 7 filled with the dielectric fluid, a two-way valve 8 being disposed in the dielectric fluid circuit such as to connect the output of the pump 6 to the passageway 5 during the first machining step.

In the course of the first machining step, the workpiece is displaced according to a translation motion along a predetermined path, for example along a circular or radial path. The translation motion is obtained by a cross-slide table comprising a stationary saddle 9 and an intermediary slide 10 disposed such as to be linearly slidable relative to the stationary saddle 9 in a first direction by way of linear bearings 11, the linear displacement of the intermediary slide 10 being provided by a servo motor 12.

The cross-slide table further comprises a second slide 13 which is arranged to be linearly displaceable relative to the intermediary plate 10 in a second predetermined direction, the linear displacement of the slide 13 being obtained from a second servo motor 14 through a screw 15, a linear bearing 11' being disposed between the second slide 13 and the intermediary slide 10. The workpiece 2 is mounted on the second slide 13 by means of a mounting block or plate 13'. The two servo motors 12 and 14, which are, for example, stepping motors, are controlled by a control circuit 16, as described for example in corresponding U.S. application Ser. No. 630,959, filed Nov. 12, 1975, now U.S. Pat. No. 4,057,703, issued Nov. 8, 1977, such as to displace the electrode workpiece 2 relative to the electrode tool 1 according to a circular translation motion, or orbiting motion, of an amplitude determined by a signal, appearing at the output of a comparator 17, applied to the input of the motor control circuit 16 by a line 18. The comparator 17 compares a reference signal obtained on a line 19 to a signal obtained at the output of a position detector 20 which is supplied through a line 21. The signal at the output of the position detector 20 is a function of the displacement of a rod 22 attached to a ram 23 reciprocated by a servo motor 24 such as to displace the electrode tool 1, mounted on the end of the ram 23, along an axis of penetration or feed into the workpiece 2.

The comparator 17 is arranged such as to vary the eccentricity of the translation motion of the electrode workpiece 2 proportionally to the linear displacement of the electrode tool 1, starting from a relative position of the electrodes set by means of the reference signal on line 19. The servo motor 24 is controlled by a servo control 25 integrating the machining voltage taken across the electrode tool 1 and the electrode workpiece 2 and a pair of signals obtained from a program controller 26 through lines 27 and 28. A similar program controller is described as part of the circuit disclosed in U.S. Pat. No. 3,912,898.

Monitoring of the electrode tool feed is effected by a comparator 29 comparing the value of the signal representing the position of the ram 23, which appears on the line 21, with a reference signal 30. The comparator 29 provides at its output a signal which is applied to an input of the program controller 26, via the line 31, as soon as the two signals at the inputs of the comparator 29 are equal.

The apparatus further comprises a second pump 32 for introducing in the gap between the electrodes an electrolyte solution contained in a tank 33, when the two-way valve 8 is controlled to a position placing the output at the pump 32 in communication with the channelway 5 in the electrode tool 1. The pumps 6 and 32, which are reversible, and the two-way valve 8 are controlled by the program controller 26, respectively through lines 34, 35 and 36. A second two-way valve 39 is controlled in unison with the two-way valve 8 for placing a return line 38 in communication either with the dielectric fluid tank 7 or the electrolyte tank 33, according to the position of the valve 39, respectively, via pipe 40 or pipe 42.

The two consecutive machining phases are effected as follows:

In the course of the first machining phase or step, the workpiece 2 is displaced along an orbiting circular translation path by the motors 12 and 14 from an initial relative position set by the reference signal on line 19, with an eccentricity which varies proportionally to the axial penetration of the electrode tool 1 into the workpiece 2. When the amount of feed of the electrode tool 1 into the workpiece 2 reaches the value set by the reference signal on line 30, the signal at the output of the comparator 29, appearing on line 31, operates the program controller 26 which provides at its output a signal on the line 27, which in turn acts on the servo control 25 to cause the servo motor 24 to retract the ram 23 and the electrode tool 1 until a signal at the output of the comparator 17, on line 18, becomes equal to zero at the moment corresponding to the initial relative position of the electrodes being reached.

After this occurs, the electrodes are held relative to each other in such a position, as the result of the interrelationship between the signals appearing on the lines 27 and 21, according to the method disclosed in U.S. Pat. No. 4,049,942, issued Sept. 20, 1977.

During the first machining phase, the apparatus is operating as an EDM machine with electrical discharges obtained from the pulse generator 4 occuring across the machining gap between the electrode tool 1 and the machined surface of the electrode workpiece 2, such a gap being filled with the dielectric fluid fed by the pump 6 from the tank 7 through the two-way valve 8 into the passageway 5 in the electrode tool. The overflow of dielectric fluid is returned to the tank 7 by the line 38, the return two-way valve 39 having been operated in unison with the two-way valve 8 such as to place the return line 38 in communication with the return pipe 40 leading into the tank 7.

When the penetration of the electrode tool 1 into the workpiece 2 is such that the comparator 29 supplies, on its output line 31, a signal applied to the program controller 26, the program controller 26 provides a signal on the line 34 to the pump 6, reversing the pump 6 such that the dielectric fluid, in the machining gap between the electrode tool 1 and the workpiece 2, is returned through the passageway 5 and the valve 8 to the dielectric fluid tank 7. The program controller 26, through the line 36, subsequently controls the two-way valves 8 and 39 simultaneously to place the passageway 5 in the electrode tool 1 in communication with the pump 32, and the return line 38 in communication with the return pipe 42. At the same time a command signal is applied via the line 35 to the pump 32 to start the flow of electrolyte solution from the electrolyte tank 33 to the passageway 5. The program controller 26, through a line 37, then operates the pulse generator 4 such as to connect the electrode tool 1 and the workpiece 2 across the DC power supply 3 causing the workpiece to become anodic and the electrode tool to become cathodic, a direct current of predetermined voltage and amperage thus flowing through the electrolyte in the machining gap.

During the second machining phase, or step, in the course of which the workpiece 2 is electrolytically polished, the program controller 26 commands successive retractions of the electrode tool 1 by means of appropriate signals on the line 28 controlling the control 25 of the servo motor 24 to effect the retraction of the electrode tool 1, while simultaneously applying a signal through the line 3 to the generator 4 for cutting off the machining current during retraction of the electrode tool.

The consecutive retractions of the electrode tool, which are effected from the initial relative position of the electrodes and which are followed by a relative feed of the electrodes up to such initial relative position, can be accomplished at regular intervals of time or at random, such as to maintain an optimum average machining current.

In the alternative, a lateral translation motion of very small amplitude can be maintained during the polishing phase of the workpiece.

The relative displacement of the electrodes during the electrolytic polishing step may cause streaks, caused by the linear flow of the electrolyte, to appear on the workpiece machined surface. The streaks can be removed rapidly by effecting an additional machining step by EDM, preferably at a reduced power rate, in the course of which the electrodes are again orbited relative to each other. By alternating machining steps by EDM with ECM polishing steps, a considerable economy in the time necessary for electrically machining a workpiece is obtained.

I claim:

1. A method for electrically machining an electrode workpiece by means of an electrode tool wherein electrical discharges are applied between the electrodes through a dielectric fluid in the course of a first machining step, and wherein in the course of a second machining step said dielectric fluid is at least partially replaced by an electrolyte solution through which an electrical current of predetermined value is circulated between said electrodes, said method comprising displacing said electrodes relative to each other during said first machining step according to a translation motion effected in a plane perpendicular to the direction of relative feed of said electrodes up to a predetermined amount of eccentricity, and effecting said second machining step by means of the same electrode tool as used in said first machining step after decreasing at least partially said amount of eccentricity and after having retracted said electrode tool relative to said electrode workpiece, said second machining step being effected along the axis of said feed for a distance substantially equal to the decrease of amplitude of said eccentricity.

2. The method of claim 1 wherein in the course of said second machining step the machining current is cut off for a time interval during which said electrode tool is retracted prior to advancing said electrode tool at least in said direction.

3. The method of claim 1 wherein said translation eccentricity is varied proportionally to the axial penetration of said tool in said workpiece from an initial relative position, and said second machining step is effected after bringing said electrodes to said initial relative position.

4. The method of claim 2 further comprising a third machining step following said second machining step during which a finish cut is effected on said workpiece by electrical discharge machining while said electrodes are displaced relative to each other along said translation motion.

5. The method of claim 3 further comprising a third machining step following said second machining step during which a finish cut is effected on said workpiece by electrical discharge machining while said electrodes are displaced relative to each other along said translation motion.

6. An apparatus for electrically machining an electrode workpiece by means of an electrode tool wherein in the course of a first machining step electrical discharges are applied between said electrodes across a dielectric fluid, and wherein in the course of a second machining step at least part of said dielectric fluid is replaced by an electrolyte solution through which is circulated a predetermined electrical current, said apparatus comprising means for displacing said electrodes relative to each other simultaneously along an axis of penetration of said electrode tool within said workpiece and along a translation motion effected in a plane perpendicular to said axis, means for applying across said electrodes machining electrical discharge through a dielectric fluid, means for controlling such displacement so as to maintain a predetermined machining gap between said electrodes, means for developing an electric signal as soon as the actual penetration of said tool in said workpiece and the amount of eccentricity of said translation motion reach respectively a predetermined value, means controlled by said electrical signal for withdrawing said electrode tool from said electrode workpiece along said axis of penetration and in a direction perpendicular to said axis until a relative position of said electrodes is obtained for which all the areas of machined surface of the workpiece are substantially at the same distance from the surface of said electrode tool, means for replacing at least partially said dielectric fluid by an electrolyte solution, and means for flowing a predetermined electrical current through said electrolyte solution.

7. The apparatus of claim 6 further comprising means for consecutively effecting from said relative position of said electrodes a retraction of said electrode tool followed by a feed of said electrode tool up to said relative position, and means for cutting off said electric current during said retraction.

8. The apparatus of claim 7 further comprising means for subsequently replacing said electrolyte solution by said dielectric fluid, and means for reestablishing said translation motion while simultaneously providing electrical discharges at a reduced power rate.

* * * * *

UNITED STATES PATENT AND TRADEMARK OFFICE
CERTIFICATE OF CORRECTION

PATENT NO. : 4,134,807
DATED : January 16, 1979
INVENTOR(S) : Jean-Paul Briffod

It is certified that error appears in the above-identified patent and that said Letters Patent are hereby corrected as shown below:

Column 4, line 30, change "3" to --37--.

Signed and Sealed this

First Day of May 1979

[SEAL]

Attest:

RUTH C. MASON
Attesting Officer

DONALD W. BANNER
Commissioner of Patents and Trademarks